Feb. 27, 1934.  E. D. TILLYER  1,948,636
LENS
Filed July 30, 1932
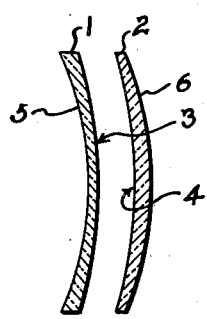
Fig. I
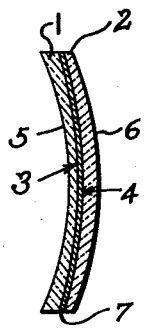
Fig. II
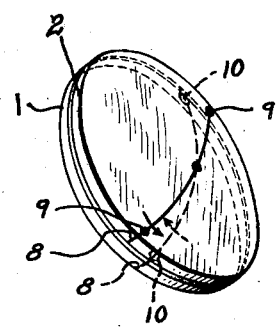
Fig. III
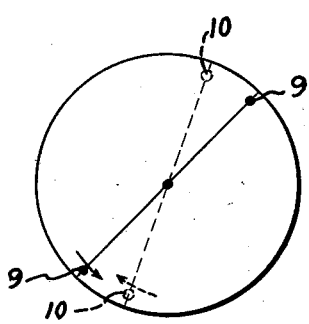
Fig. IV
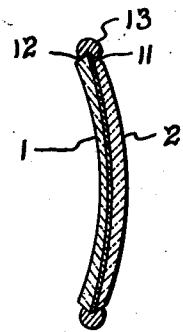
Fig. V
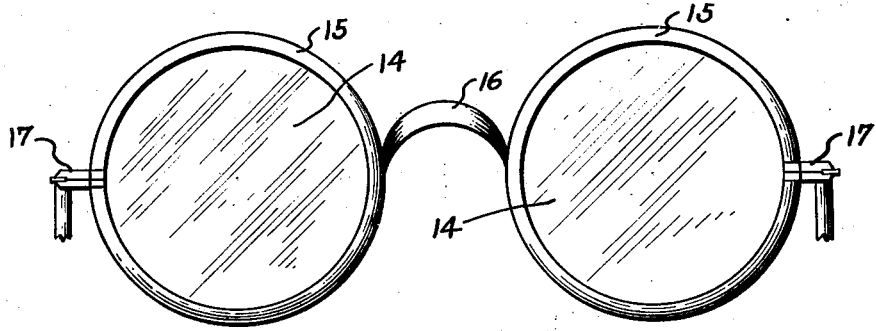
Fig. VI
INVENTOR
Edgar D. Tillyer.
BY
Harry H. Styll
ATTORNEY Patented Feb. 27, 1934

1,948,636

UNITED STATES PATENT OFFICE 1,948,636

LENS

Edgar D. Tillyer, Southbridge, Mass., assignor to American Optical Company, Southbridge, Mass., a voluntary association of Massachusetts Application July 30, 1932. Serial No. 626,557

4 Claims. (Cl. 88—54)

This invention relates in general to lenses, and more particularly has reference to an improved bitoric lens and method of making the same.

One object of this invention is to produce a bitoric lens in which the axes may be accurately and positively aligned with respect to each other after the toric curves have been ground.

Another object is to produce a lens structure such that a variety of parts for the same may be made in the factory and sold to the dispenser, from which he can form lenses with any desired combination of curves.

Another object is to provide a method of making a lens having a toric curve on both sides, in which the axes may be more accurately positioned with respect to each other than in the prior art processes.

Other objects and advantages will become apparent from the following description taken in connection with the accompanying drawing, and it will be apparent that many changes may be made in the details of construction and arrangements of parts without departing from the spirit of the invention as expressed in the accompanying claims. I therefore do not wish to be limited to the exact details shown and described, as the preferred form only has been shown by way of illustration.

Referring to the drawing:

Figure I is a sectional view illustrating the parts of the lens of this invention in unassembled relation.

Figure II shows the parts after they have been put together.

Figures III and IV illustrate the manner of aligning the parts of the lens.

Figure V is a view in section showing how the lens of this invention may be mounted in a frame, and Figure VI shows a pair of such lenses mounted in a spectacle frame.

A bitoric lens is made for many purposes. One is to produce better oblique corrections for astigmatism and power, especially in moderate and strong sphero-cylinder corrections, as is well known. Another purpose is to produce a different magnification in one meridian than in another.

Lenses of the bitoric type, that is, lens having toric curves on both faces thereof, are not unknown to the prior art, but there has never been devised a thoroughly satisfactory method of producing them. A most important factor in the production of these lenses is, of course, that the axes be very accurately located with respect to each other. The most common method which has been employed in attempting to produce lenses of this kind has been to block the lens blank in the ordinary manner and grind the toric surface on one side, then block it with the other side up with the axis as nearly in alignment as possible with the tool, and grinding the second toric surface.

As will be readily apparent, it is extremely difficult, if not impossible, to produce a lens with its axes accurately and properly aligned by this method. The matter of aligning the lens with one surface ground on it so that the other surface would be in proper alignment was at best a more or less hazardous and guesswork proposition.

One of the principal objects of my invention is, therefore, to grind both toric surfaces first and align them afterwards when it can be accurately done, thus producing an improved and more practical bi-toric lens.

Another object is to provide a means and method whereby a lens of a given combination can be formed from a standard assortment of parts, without grinding.

Referring now more particularly to the drawing, there is shown in Figure I a pair of lens blanks, 1 and 2. The adjacent surfaces 3 and 4 of these two blanks are preferably ground to the same spherical curves, one being convex and the other concave, so that they will about fit each other. The outer surfaces 5 and 6 are formed by blocking the blanks up separately and grinding on these surfaces the toric curves which it is desired for the finished lens to have. All four of the curves which have been ground are polished to optical surfaces.

The two blanks 1 and 2 are then carefully marked to indicate the position of their axes by marks such as the marks 8 on the edges of the blanks, or the dots 9 placed on the face of the blanks.

After the axes of the two blanks have been marked, a thin coating of a cementitious material 7 is placed between the spherical surfaces of the blanks and they are placed together. Then, before the cementitious material is allowed to harden, the blanks are rotated one on the other until the axes indicated by the marks 8 or 9 are brought into the proper alignment with each other.

The cementitious material 7 may be of a type which hardens by drying, or it may be of a type which requires a comparatively low degree of heat to cause it to harden. It should possess substantially the same index of refraction as the glass used in forming the two lens blanks, and it should be perfectly transparent.

After the two lenses have been aligned in the manner just described, and have been firmly secured together by the material 7, they may then be beveled as illustrated in Figure V, with beveled surfaces 11 and 12, so that they will fit within the rim 13 which is adapted to receive them.

It will be understood that finished lenses made in this manner will be adapted to be mounted in spectacle frames, or in other types of spectacle mountings, as for example the one illustrated in Figure VI. In this figure, the complete finished lens has been designated as 14, and is shown as being held by the rims 15, which are connected by the bridge member 16 in the well known manner. These spectacles which are illustrated are of a type which are supported on the face of the wearer by temple members which are connected with the same by means of the endpieces 17.

It will be seen from the above that means have been provided whereby a bi-toric lens may be made very accurately and in its final form will be in effect but a single lens. It may be mounted as a single lens and to all intents and purposes the effect is the same as though the two toric surfaces had been ground directly upon a single piece of glass, except that they may be much more accurately aligned by the method just described.

It will be readily understood that although the surfaces 3 and 4 have been described as spherical surfaces, they could be made plano as well as spherical, and the result would be the same. Accordingly, the term spherical as used in the accompanying claims will be intended to include not only spherical curved surfaces but also plano surfaces.

Also, it will be appreciated that other than toric surfaces may be substituted for the surfaces 5 and 6. If for example, a series or an assortment of both the blanks 1 and the blanks 2 were to be sold to the dispenser, it would be possible for him to make from this assortment lenses having almost any desired combination of curves without the necessity of grinding the surfaces which he desired to place upon the lens. This would make a lens of this type essentially a factory made product and would eliminate a great deal of the difficulty now encountered by dispensers in putting lenses of this type on the market.

There has been set forth above a bi-toric lens which is an improvement over the prior art form, because it is possible to more accurately align the axes thereof. Furthermore, a method has been set forth for producing the same, and together these constitute a very distinct advance in the art. It will be seen, therefore, that the lens and method described will accomplish fully the objects sought by this invention.

It will be understood that in adjusting the axes of the lens parts the lenses should be placed in a lens measuring instrument, such as is well known, and the adjustment checked before the cement or other material is allowed to harden.

Having described my invention, I claim:

1. The process of forming a bitoric lens comprising forming one of the toric surfaces desired on one lens blank and forming a spherical surface on the opposite side of said blank, forming the other toric surface desired on another lens blank and forming on the opposite side of said second mentioned blank a spherical surface complementary to the spherical surface on the first lens blank so that the spherical surfaces will fit together, locating the axes of the respective toric surfaces, placing the blanks against each other with their spherical surfaces together, rotating the blanks with respect to each other until the axes are properly positioned with respect to each other, and securing the blanks together in this position to form a unitary bitoric lens.

2. The process of forming a lens whose outer surfaces have different curvatures in their two major meridians, comprising forming one of the said outer surfaces desired on one lens blank and forming a desired surface on the other side thereof, forming the other outer surface desired on another lens blank and forming on the opposite side of said second blank a surface complementary to the inner surface on the first blank so the said inner surfaces will fit together, locating the axes of the respective outer surfaces, placing the blanks against each other with their inner surfaces together, moving the blanks with respect to each other until the axes are properly positioned with respect to each other and securing the blanks together in this position to form a unitary lens.

3. The process of forming a lens whose outer surfaces depart from a true spherical curvature comprising forming one of the said outer surfaces desired on one lens blank and forming a desired surface on the other side thereof, forming the other outer surface desired on another lens blank and forming on the opposite side of said second blank a surface complementary to the inner surface on the first blank so the said inner surface will fit together, locating the axes of the respective outer surfaces, placing the blanks against each other with their inner surfaces together, moving the blanks with respect to each other until the axes are properly positioned with respect to each other and securing the blanks together in this position to form a unitary lens.

4. The process of forming a lens having an outer surface that departs from a true spherical curvature comprising forming said outer surface desired on one lens blank and forming a desired surface on the other side thereof, forming a desired outer surface on another lens blank and forming on the second side thereof a surface complementary to the inner surface of the first blank so the said inner surfaces will fit together, locating the axes of the respective outer surfaces, placing the blanks against each other with their inner surfaces together, moving the blanks with respect to each other until the axes are properly positioned with respect to each other and securing the blanks together in this position to form a unitary lens.  EDGAR D. TILLYER.